United States Patent

[11] 3,586,442

| [72] | Inventor | Robert W. Tripp<br>Tuckahoe, N.Y. |
|---|---|---|
| [21] | Appl. No. | 780,060 |
| [22] | Filed | Nov. 29, 1968 |
| [45] | Patented | June 22, 1971 |
| [73] | Assignee | Farrand Optical Co., Inc.<br>New York, N.Y. |

[54] ZERO DISPERSION DOUBLE MONOCHROMATOR
7 Claims, 4 Drawing Figs.

| [52] | U.S. Cl. | 356/99,<br>356/101 |
|---|---|---|
| [51] | Int. Cl. | G01j 3/18 |
| [50] | Field of Search | 356/83,<br>98—101 |

[56] References Cited
UNITED STATES PATENTS

| 2,743,646 | 5/1956 | Strong | 356/99 X |
| 2,797,609 | 7/1957 | White | 356/99 |
| 2,922,331 | 1/1960 | Fastie et al. | 356/99 |
| 3,460,892 | 8/1969 | Dolin | 356/83 |
| 3,191,488 | 6/1965 | Eisner | 356/99 X |

OTHER REFERENCES

Pierce: APPLIED OPTICS, volume 3, number 12, December 1964, pages 1337— 1346

Oldenberg: " On the Intensity of Illumination in Spectrographs," JOURNAL OF THE OPTICAL Society of America vol. 22, No. 8, August 1932, pages 441— 455.

*Primary Examiner*—Ronald L. Wibert
*Assistant Examiner*—F. L. Evans
*Attorney*—Lennie, Edmonds, Morton, Taylor and Adams

ABSTRACT: A zero dispersion double monochromator wherein light from an entrance aperture which has been collimated is spectrally dispersed and reimaged only in the meridian (direction) corresponding to the direction of dispersion. A reflecting device located at the spectrum so formed is tilted about an axis parallel to the direction of dispersion to reflect the light back to the same system to form an image of the entrance aperture at an exit aperture which is displaced from the entrance aperture in a direction normal to the direction of dispersion.

A mask is placed over the reflecting device for blocking a portion of the light so that light having a desired spectral content is reflected.

FIG. 3a  NEW ART

INVENTOR.
ROBERT W. TRIPP
BY
*Robert G. Rogers*
ATTORNEY

ZERO DISPERSION DOUBLE MONOCHROMATOR

BACKGROUND OF THE INVENTION

1. Field of the Invention

The invention relates to a zero dispersion double monocromator and more particularly to such a monochromator in which the same optical system serves both monochromators and provides a separation between entrance and exit apertures.

The invention described herein was made in the performance of work under a NASA contract and is subject to the provisions of Section 305 of the National Aeronautics and Space Act of 1958, Public Law 85-569 (72 Stat. 435; 42 U.S.C. 2457).

2. Description of Prior Art

Certain zero dispersion double monochromators use a first monochromator to produce a spectrum and a second monochromator to reimage the spectrum at an exit slit. A field lens is located at the produced spectrum to transmit light to the second monochromator. A mask is placed over the field lens to determine the spectral content.

If the field lens is replaced by a field mirror, light may be folded back through an optical system so that a single monochromator can be used as a double monochromator. However, in that case the entrance and exit apertures coincide and some means must be provided to separate the apertures. Although a beam splitter may be used in certain applications, the light transmission efficiency is reduced by 75 percent.

Monochromators may be used to produce light at a constant energy level as required, for example, in simulating light from a particular star. The devices can also be used to select a single wavelength of light, produce a desired color, and by proper masking, various wavelengths can be mixed in various proportions. For such applications, it is desirable to be able to reduce the amount of energy without a loss of efficiency in the system.

The present system, as described herein, provides a system which can be effectively used for the purposes indicated and for such other purposes as may be appropriate.

SUMMARY OF INVENTION

Briefly, the invention comprises a zero dispersion double monochromator in which the same optical devices are used to transmit light from an entrance aperture to an intervening focal plane and from the intervening focal plane to an exit aperture. A reflecting device located at the focal plane is tilted so that the entrance and exit apertures are separated. A mask is placed over the reflecting device to produce light having a desired spectral content.

Therefore, it is an object of this invention to provide an improved monochromator in which the light path between the entrance aperture and the intermediate spectral focal plane is essentially the same as that between the focal plane and the exit aperture.

Another object of the invention is to provide a double monochromator in which the same optical devices are used for both monochromators and in which a tilt angle is introduced by a device at the intermediate focal plane for focusing the outgoing light at an exit aperture which is displaced from the entrance aperture.

It is another object of this invention to provide a monochromator having reduced abberations and improved light transmission characteristics.

Still another object of this invention is to produce a light image having a desired spectral content.

A still further object of this invention is to reduce wavelength shifts in light imaged at an exit aperture of a double monochromator by using one single monochromator twice between the entrance and exit apertures.

Still a further object of the invention is to form a desired spectral distribution of light and to reflect the light at an angle for focusing light at an exit aperture which is displaced from an entrance aperture.

A still further object of the invention is to provide a zero dispersion double monochromator in which a selected wavelength range can be shifted.

Another object of the invention is to provide a device in which separate means are used to establish a relative spectral distribution and the spectral location of the distribution.

These and other objects of this invention will become more apparent when taken in connection with the following description of drawings.

BRIEF DESCRIPTION OF DRAWINGS

FIGS. 3a and 3b illustrate the difference between the light paths in the FIG. 1 system and DESCRIPTION light paths of a prior art system.

DESCRIPTION OF PREFERRED EMBODIMENT

Figure 1:
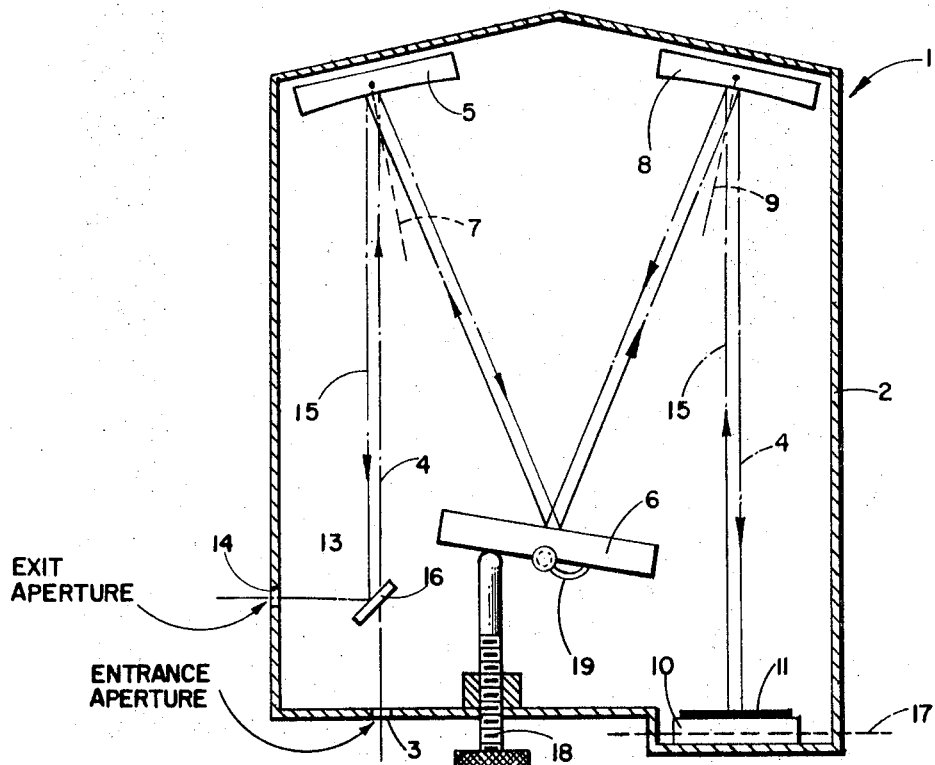
FIG. 1 is a schematic representation of one embodiment of the monochromator.

FIG. 1 illustrates one embodiment of monochromator 1 comprising housing 2 having entrance aperture 3 for light directed along light path 4. The light path 4 is shown as a single broken line with arrows pointed away from entrance aperture 3.

Any convenient means may be used to introduce light into the entrance aperture which may be in the form of a narrow slit. For example, an arc lamp with an appropriate focusing device, such as an ellipsoidal mirror, can be used as a source of the light focused, or imaged, at the entrance aperture 3. A light source having wavelengths of light within a spectral region of interest should be selected.

Light from the entrance aperture 3 is received by a collimating device such as spherical mirror 5 and reflected towards a dispersing device such as optical grating 6.

The spherical mirror 5 should be positioned at a distance of one-half its radius from the entrance aperture 3. The optical axis 7 of the spherical mirror 5 is shown as a dotted line which bisects the angle of the light ray 4 emanating from the entrance aperture 3 and impinging upon the optical grating 6.

The optical grating 6 disperses, or separates, the direction of the collimated light as a function of the wavelength of the light.

Threaded screw member 18 may be used to vary the spectral range of interest by changing the position of grating device 6 about member 19 which may, for example, be a bearing supported spring loaded shaft. By rotating the screw clockwise or counterclockwise the angle of the surface of the grating can be changed with respect to the incoming light and thereby change the spectral range involved.

While the system is described as an all-mirror system, it should be understood by persons skilled in the art that a system may employ lenses or parabolic reflectors for the collimating elements. Similarly, prisms or prism-grating combinations may be used instead of an optical grating for the dispersion element.

The light from the optical grating 6 is reflected toward a first reimaging device such as cylindrical mirror 8. The cylindrical mirror 8 has its cylindrical axis vertical and normal to the plane of the paper and thus has its power in the plane of the paper. For example, the light is focused in a horizontal direction to form a spectrum of light on a second reimaging and reflecting device, such as cylindrical field mirror 10. In other words, the mirror 8 has power in the horizontal plane only for reimaging the light in the direction of dispersion. The mirror 8 thus has greater dioptric power in the plane of the paper, and hence in the direction of the dispersion, than in directions normal to the direction of dispersion. For example, if the spectrum is considered as a series of adjacent lines representing the wavelengths of light forming the spectrum, the mirror would not have power in the direction parallel to the lengths of the spectrum lines. Since the mirror 8 has no power in the vertical direction, the height of the spectrum formed does not depend on the height of the entrance aperture but is approximately equal to the aperture of the system.

The height of the spectrum facilitates fabrication of a suitable mask for controlling the spectral content of the light as described in the following paragraphs. The spectrum is relatively insensitive to variations in intensity in a direction along the height of the entrance aperture.

The distance from cylindrical mirror 8 to cylindrical field mirror 10 is one-half the radius of the cylindrical mirror 8. The optical axis 9 of mirror 8 bisects the angle between the light ray 4 from grating 6 and the light ray 4 impinging upon field mirror 10. Both the spherical mirror 5 and the cylindrical mirror 8 have the same radii of curvature.

Light from cylindrical mirror 8 passes through a mechanical filter such as mask 11 to the surface of the cylindrical field mirror 10. The cylindrical axis of mirror 10 is parallel to the cylindrical axis of mirror 8. The field mirror 10 thus also has greater dioptric power in the direction of the dispersion than in directions normal thereto. Field mirror 10 preferably has a radius equal to its distance from the aperture of the system which may be assumed to be the aperture of grating device 6.

The mask, which may be comprised of any nonreflecting opaque material, such as blackened steel, is formed with slits, or openings, for passing certain portions of the impinging light.

Figure 2:
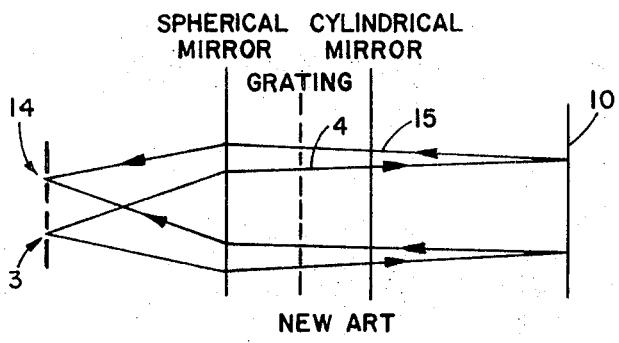
FIG. 2 is a mask usable with the FIG. 1 embodiment.
Figure 2:
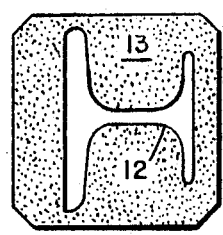

One embodiment of mask 11 can be seen by referring to FIG. 2. As shown therein, the mask is provided with opening 12 for passing predetermined energy levels of certain wavelengths of the light. The remainder of the light is blocked by portion 13 of the mask.

In a practical application, the light from the cylindrical mirror 8 is analyzed to determine the energy content of each wavelength prior to fabricating the mask. If a constant energy source is desired, the mask would be provided with an opening for passing an equal amount of energy at each wavelength of the spectrum. As a result, the opening 12 may have the odd shape seen in FIG. 2.

For color mixing and in other embodiments, the mask would be formed with different opening configurations. A mask with adjustable openings could be used to vary the content of the reflected light over a desired range.

Cylindrical field mirror 10 in housing 2 is positioned, or tilted, so that the light through the mask is reflected toward the cylindrical mirror 8 and back through the optical devices of the monochromator to the exit aperture 14 as illustrated generally in FIG. 3a. For example, mirror 10 is positioned so that the light is reflected towards the exit aperture 14 along light path 15. The cylindrical field mirror 10 is inclined or tilted about an axis parallel to the direction of dispersion of the spectrum. The axis lies in the plane of the paper and is normal to the direction of the light paths 4 and 15. It is represented by the dotted line 17 through field mirror 10.

If the tilt is about the axis in a clockwise direction as shown in FIG. 3a, the exit aperture 14 would be vertically displaced above the entrance aperture as shown. A counterclockwise tilt would result in the displacement being below the entrance aperture.

The optical devices used in directing the light to cylindrical field mirror 10 are also used in directing the light to exit aperture 14.

It should be noted that the light paths 4 and 15 are separated in FIG. 1 for convenience only. Normally, both light paths would be coincident with each other except for the vertical displacement as shown in FIG. 3a.

Plane mirror 16 is placed in light path 15 at a 45° angle relative to the light path. Light from the mirror is reflected towards exit aperture 14 for such uses as previously described. The plane mirror 16 is used for purposes of the illustrated embodiment only. It should be obvious that without the mirror the exit aperture 14 would be parallel to the entrance aperture 3 but vertically displaced. In order to clearly illustrate both apertures, the mirror is inserted in light path 15. The apertures are still vertically displaced but in different vertical planes as shown in FIG. 3a.

In addition, since the light paths are displaced by the tilt angle of the cylindrical field mirror 10, the mirror 16 is positioned above the light path 4. As a result, the incoming light along light path 4 is not intercepted by the mirror 16, which is interposed in the light path 15.

Figure 3B:
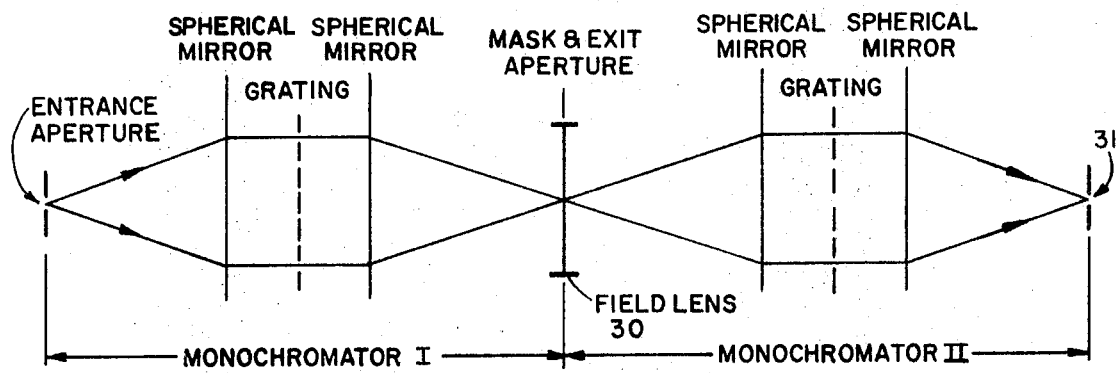

FIG. 3a is an illustration, not to scale, of how light from entrance aperture 3 travels along light path 4 to the cylindrical field mirror 10. The figure also illustrates the tilt of field mirror 10 so that the unblocked spectral portion of the light is reflected along light path 15 to exit aperture 14 which is vertically displaced from entrance aperture 3. Plane mirror 16 is omitted for clarity. FIG. 3b illustrates an example, not to scale, of a light path in a prior art device. Instead of being reflected back along the same light path as shown in FIG. 3a, the light is passed through a suitably masked field lens 30. The light is refocused at exit aperture 31.

It is pointed out that the invention is not limited to the particular "M" path of light shown in the FIG. 1 monochromator. By placing the devices of the optical system at different locations, different light path configurations can be produced if required.

Although the invention has been described and illustrated in detail, it is to be understood that the same is by way of illustration and example only, and is not to be taken by way of limitation. The spirit and scope of the invention is limited only by the terms of the appended claims.

I claim:

1. A zero dispersion double monochromator comprising means defining an entrance aperture, means for defining an exit aperture, means for collecting light diverging from said entrance aperture, means for dispersing light collimated by said collimating means, means for reimaging said dispersed light in the direction of the dispersion to produce a spectrum, said reimaging means having greater dioptric power in the direction of the dispersion than in directions normal thereto, and means for reflecting said spectrum through the above-recited reimaging, dispersing and collimating means in the reverse direction, said reflecting means being positioned adjacent the focus of said reimaging means in the direction of the dispersion and being oriented for directing said spectrum by reflection to said exit aperture, said exit aperture being displaced from the entrance aperture in a direction normal to the direction of dispersion.

2. The combination recited in claim 1 including means positioned between said reimaging means and said reflecting means for blocking a portion of said spectrum whereby only the unblocked portion of said spectrum is reflected.

3. The combination recited in claim 1 wherein said reimaging means comprise a cylindrical mirror whose axis is substantially perpendicular to the direction of the dispersion.

4. The combination recited in claim 1 wherein said reflecting means have greater dioptric power in the direction of the dispersion than in directions normal thereto.

5. The combination recited in claim 4 wherein said reflecting means comprise a cylindrical mirror whose axis is substantially perpendicular to the direction of the dispersion.

6. The combination recited in claim 5 wherein said cylindrical mirror is inclined about an axis parallel to the direction of the dispersion for producing vertical displacements between said apertures.

7. The combination recited in claim 1 wherein said dispersion means comprise an optical grating and said reimaging and reflecting means comprise cylindrical mirrors whose axes are substantially perpendicular to the direction of the dispersion.

PO-1050
(5/69)

UNITED STATES PATENT OFFICE
CERTIFICATE OF CORRECTION

Patent No. 3,586,442          Dated  June 22, 1971

Inventor(s)    Robert W. Tripp

It is certified that error appears in the above-identified patent and that said Letters Patent are hereby corrected as shown below:

Column 1, line 14, for "85-569" should read --85-568--;
         line 68, for "this" should read --the--.
Column 2, line 17, for "DESCRIPTION" should read --the--.
Column 4, line 34, for "collecting" should read --collimating--.

Signed and sealed this 28th day of December 1971.

(SEAL)
Attest:

EDWARD M. FLETCHER, JR.          ROBERT GOTTSCHALK
Attesting Officer                Acting Commissioner of Patents